C. H. MOSHER.
RAKE FOR ROTARY LAWN CLEANERS.
APPLICATION FILED APR. 14, 1909.
948,820.
Patented Feb. 8, 1910.
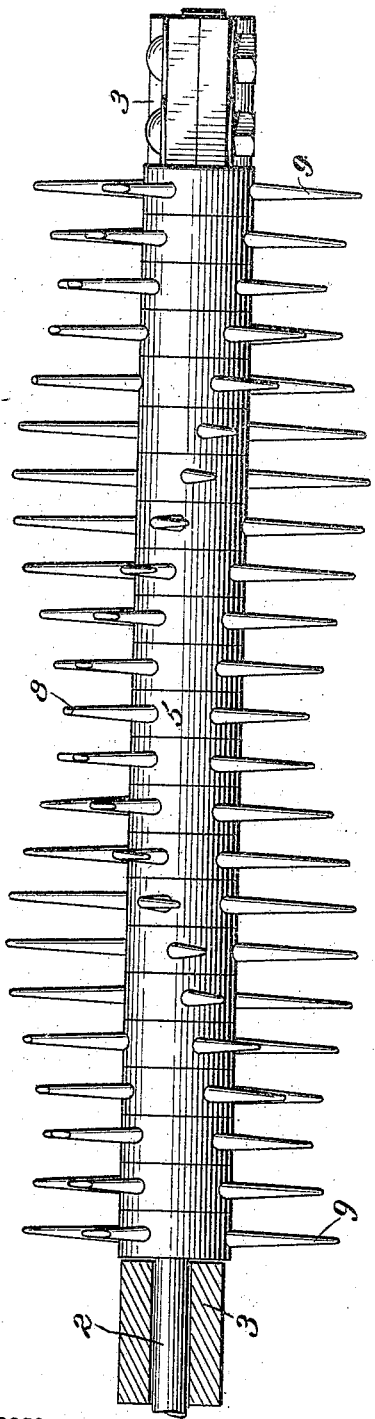
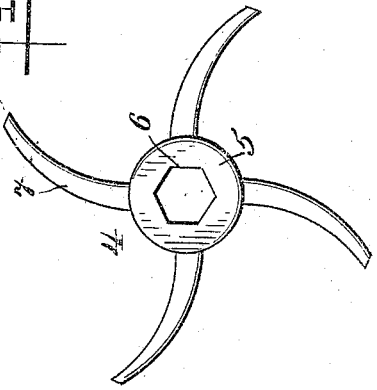
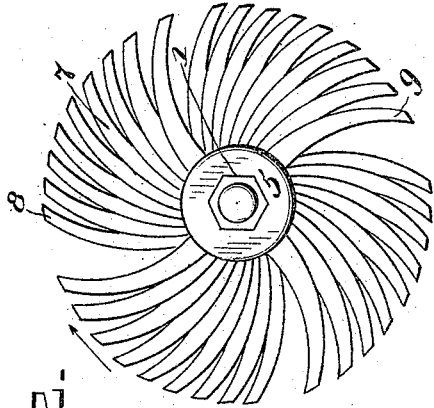
WITNESSES
INVENTOR
Clarence H. Mosher.
BY
ATTORNEYS

UNITED STATES PATENT OFFICE.

CLARENCE HENRY MOSHER, OF SALISBURY MILLS, NEW YORK.

RAKE FOR ROTARY LAWN-CLEANERS.

948,820.  Specification of Letters Patent.  Patented Feb. 8, 1910.

Application filed April 14, 1909. Serial No. 489,763.

*To all whom it may concern:*

Be it known that I, CLARENCE HENRY MOSHER, a citizen of the United States, and a resident of Salisbury Mills, in the county of Orange and State of New York, have invented a new and Improved Rake for Rotary Lawn-Cleaners, of which the following is a full, clear, and exact description.

This invention relates to a rotary rake to be used in lawn cleaners, such as the lawn cleaner patented to me April 16, 1907, Patent No. 850,777. Lawn cleaners of this type embody in their construction rotary rakes which in rotating take up the leaves, grass, cuttings, twigs, and other debris from the ground, and these leaves are afterward advanced into a receptacle.

The object of this invention is to produce a rotary rake having an improved construction in which the teeth are separately attached, and in which the teeth are arranged in rows or phalanxes, the individuals of each row being advanced progressively with respect to each other.

The invention consists in the construction and combination of parts to be more fully described hereinafter and particularly set forth in the claim.

Reference is to be had to the accompanying drawings forming a part of this specification, in which similar characters of reference indicate corresponding parts in all the figures.

Figure 1 is a side elevation of a rake constructed according to my invention; Fig. 2 is an end view of the rake; and Fig. 3 is an end elevation of one of the rings or hubs upon which the teeth are formed.

Referring more particularly to the parts, 1 represents a shaft, the body of which is of angular form, such as the hexagonal form indicated. This shaft 1 is formed with reduced necks 2, or journals, at its extremities, which are received in suitable bearings or boxes 3, so that the shaft may rotate freely when driven.

The body of the rake is formed of a plurality of sections 4. Each section comprises a hub or ring 5, having a hexagonal central opening 6 formed thereupon, which fits nicely over the hexagonal body of the shaft. Integral therewith each hub is provided with teeth 7 which are curved, as shown, and project in a substantially radial direction. These rake sections are alike except that the teeth 7 are arranged upon them in a slightly advanced angular relation so that when the sections are assembled together to form a complete rake, as shown in Fig. 1, the teeth will dispose themselves in curved lines on the hubs. The tooth, such as the tooth 8 on the central hub, is the farthest in the rear with respect to the direction of rotation and the teeth adjacent to this tooth are slightly advanced with respect to the same. The next teeth are slightly farther advanced, and so on, and the outermost teeth 9 are the most advanced teeth of each row. From this description it will be noted that the teeth are arranged progressively with respect to their angular position. These rake sections may be made of malleable iron or similar material, and the teeth are cast integral with the hubs, as stated above. On account of the fact that the teeth can be readily removed, it is evident that their relative arrangement may be altered as desired, that is, their relative angular advance with respect to each other can be changed, as desired, producing different effects or adapting them especially for operation on different kinds of debris.

In practice, when two of these rakes are mounted opposite to each other they are rotated so that their adjacent sides move upwardly, that is, they are rotated in the direction of the arrow indicated in Fig. 2. In this way, on account of the fact that the most advanced teeth in any row are at the ends of the shaft, they will exert a tendency to bring in the leaves and other things picked up toward the middle point of the rake. This makes the rake effective throughout its entire length, and it overcomes the tendency of the outermost teeth to throw the leaves away beyond the reach of the rake.

Having thus described my invention, I claim as new and desire to secure by Letters Patent,—

A rake of the class described, having a shaft of angular form, and a plurality of hubs having angular openings receiving said shaft, said hubs having teeth projecting therefrom, said teeth being advanced angularly and progressively with respect to the direction of rotation and producing rows of teeth extending from one end to the other of said rake, the individual teeth near the middle of said rows being disposed toward the rear with respect to the direction of rotation.

In testimony whereof I have signed my name to this specification in the presence of two subscribing witnesses.

CLARENCE HENRY MOSHER.

Witnesses:
   PETER CANTLINE,
   JOHN A. SEEGER.